No. 718,847. PATENTED JAN. 20, 1903.
G. H. KELLEY.
TOBACCO KNIFE.
APPLICATION FILED APR. 8, 1901. RENEWED SEPT. 13, 1902.
NO MODEL.

Witnesses
Bernard M. Offutt
E. K. Bond

Inventor
George H. Kelley
By A. B. Webb
His Attorney

UNITED STATES PATENT OFFICE.

GEORGE HILLERY KELLEY, OF STANLEY, KENTUCKY.

TOBACCO-KNIFE.

SPECIFICATION forming part of Letters Patent No. 718,847, dated January 20, 1903.

Application filed April 8, 1901. Renewed September 13, 1902. Serial No. 123,356. (No model.)

*To all whom it may concern:*

Be it known that I, GEORGE HILLERY KELLEY, a citizen of the United States, residing at Stanley, in the county of Daviess and State of Kentucky, have invented certain new and useful Improvements in Tobacco-Knives; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has relation to improvements in tobacco-knives; and the object is to provide an implement of the kind named and for the purposes intended which is strong and simple in construction and efficient in operation.

I have fully and clearly illustrated my invention in the accompanying drawings, in which—

Figure 1:
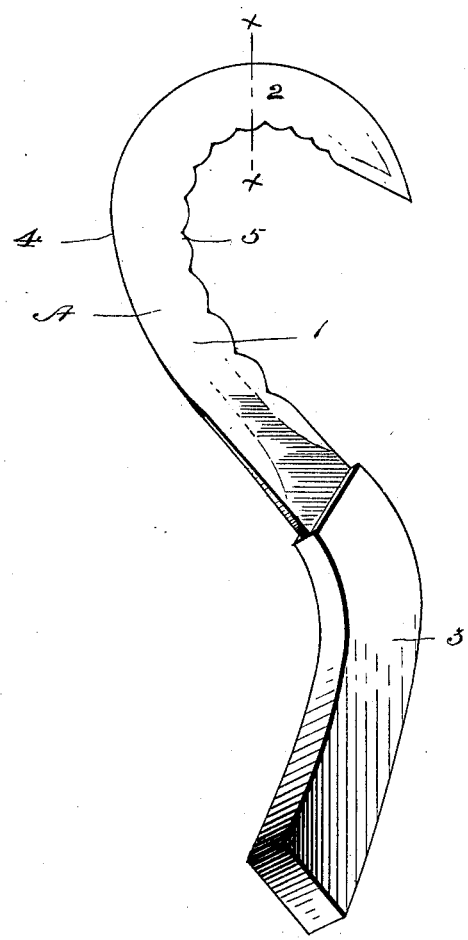
Figure 2:
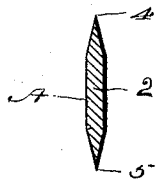

Figure 1 is a perspective view of the knife, and Fig. 2 a cross-section on the line x x of Fig. 1.

Like numerals of reference indicate like parts in both of the views.

A designates a strong blade of steel having a main cutting portion 1 and a curved or circular termination 2 and a handle part or shank 3, bent at an angle to the main blade part 1. The blade is made with a smooth cutting edge 4, extending from a point a short distance from the base of the blade to the point, and a scalloped or waved cutting edge 5 on the opposite side extending from the base of the blade to a distance from the point, substantially as shown, so that the stroke or draft of the implement presents a shearing function to the stalk being cut, the scallops being larger at the base of the blade and gradually decreasing in size toward the point, and a smooth cutting edge adjacent to the point, the smooth cutting edges of the point being used for the lighter cutting and the scallops for the heavier work.

The use of the implement is well known in the trade and may be stated as follows: The implement is grasped in the hand by the handle, and then the stalk is held by the other hand, and the stroke is made with either edge, as desired, and severed.

Having thus described my invention, what I claim as new, and desire to secure by Letters Patent, is—

The tobacco-knife herein described, consisting of a blade having a handle bent or directed at an angle thereto, and having a curved, rounded and hooked end, the outer edge of the blade and the hook having a smooth cutting edge from base to point, and the inner edge of the blade from base to a point adjacent to the point being formed with scallops decreasing in size from the lower one at the base to the last one at the point, and a smooth cutting edge adjacent to the point, substantially as and for the purpose herein set forth.

In testimony whereof I affix my signature in presence of two witnesses.

GEORGE HILLERY KELLEY.

Witnesses:
 W. W. OWEN,
 W. O. FRANKLIN.